P. P. LOCKLING & J. F. PARKER.
AUTOMATIC FARE REGISTER.
APPLICATION FILED JAN. 16, 1914.
1,113,797.
Patented Oct. 13, 1914.
4 SHEETS—SHEET 1.
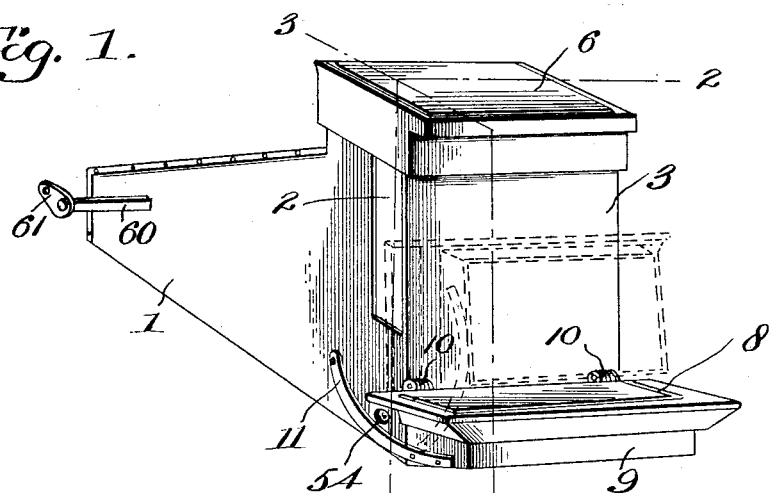
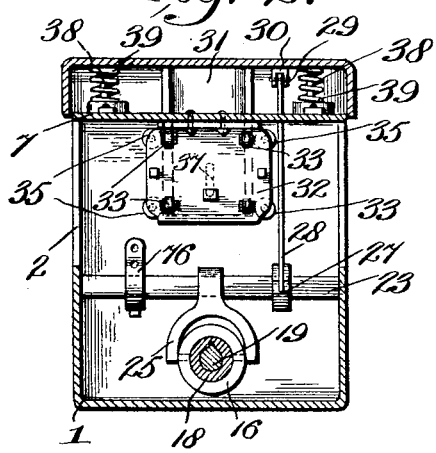
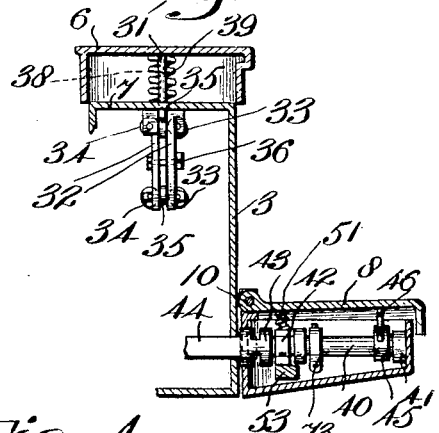
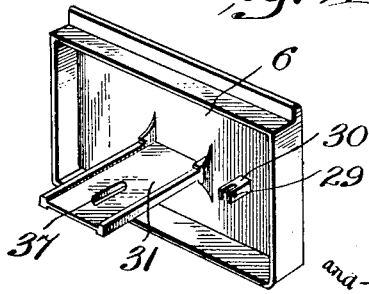
Witnesses
Inventors
Paul P. Lockling,
Joseph F. Parker,
by Wilkinson, Cinata & Mackay
Attorneys

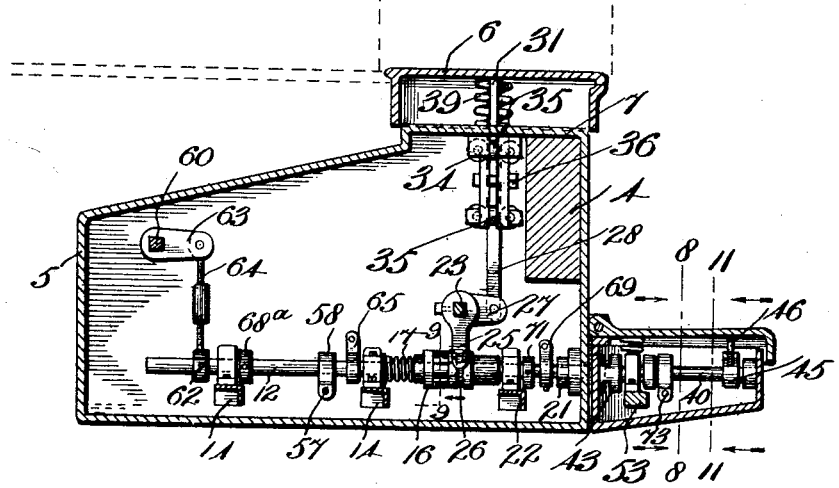
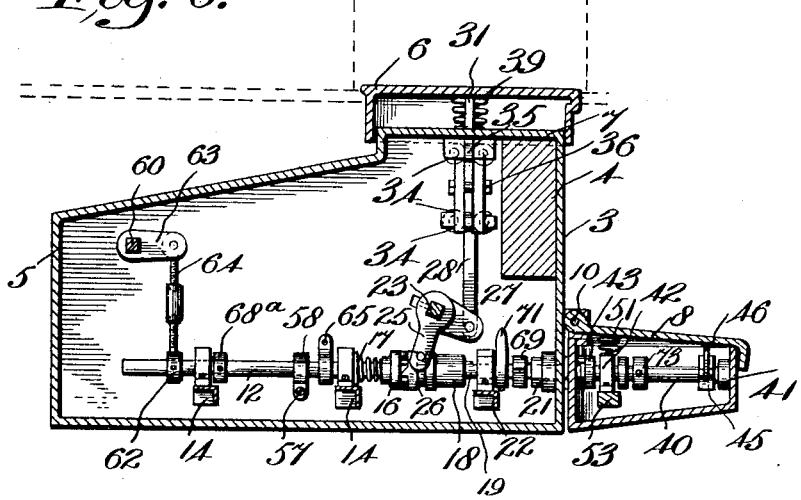

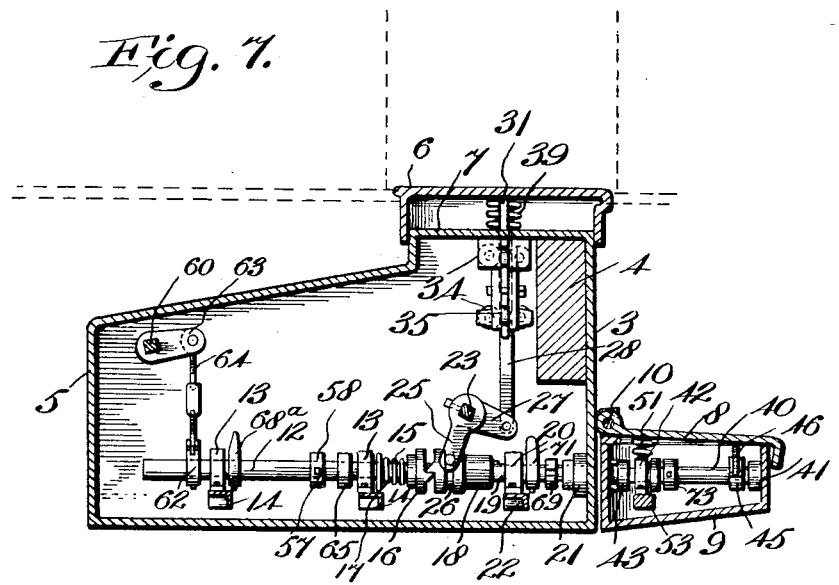
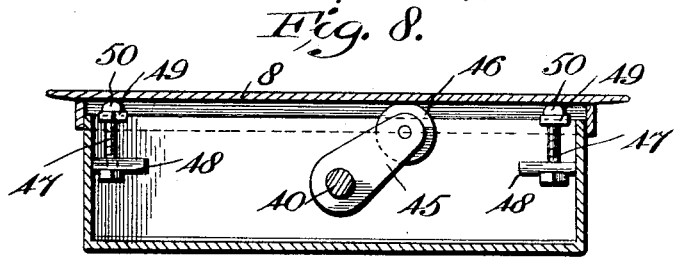
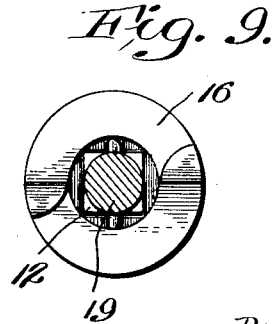

UNITED STATES PATENT OFFICE.

PAUL P. LOCKLING, OF FRUITDALE, AND JOSEPH F. PARKER, OF MOBILE, ALABAMA, ASSIGNORS TO PAUL P. LOCKLING IMPROVED AUTOMATIC PASSENGER FARE REGISTERING COMPANY, OF MOBILE, ALABAMA, A COPARTNERSHIP.

AUTOMATIC FARE-REGISTER.

1,113,797.  Specification of Letters Patent.  Patented Oct. 13, 1914.

Application filed January 16, 1914. Serial No. 812,555.

*To all whom it may concern:*

Be it known that we, PAUL P. LOCKLING and JOSEPH F. PARKER, citizens of the United States, residing at Fruitdale and Mobile, in the counties of Washington and Mobile, and State of Alabama, respectively, have invented certain new and useful Improvements in Automatic Fare-Registers; and we do hereby declare the following to be a full, clear, and exact description of the invention, such as will enable others skilled in the art to which it appertains to make and use the same.

The present invention relates to automatically actuated fare registers for street cars and has for its purpose to provide a self contained and readily portable apparatus which may be conveniently attached to a car without requiring any alteration in the car structure, and by which the number of passengers carried by the car is registered through the medium of the passengers themselves in leaving the car.

A further purpose of the invention is to provide a passenger registering mechanism which will not be operated by the passengers on entering the car; and one wherein two independent registers may be employed to the end that either may be used alone, or both together with one serving as a check upon the other.

It is further contemplated to construct a register of the type in question wherein the register control is contained within a casing forming a step, and which may be conveniently swung into inoperative position when the car is running "special" or going into the barn.

The invention disclosed herein constitutes an improvement over the automatically actuated register shown and described in our U. S. Patent granted November 12, 1912, and bearing the Number 1,044,402, and for a detailed disclosure of which reference may be had thereto.

With these and other objects in view the invention consists in the novel details of construction and combinations of parts more fully hereinafter disclosed and particularly pointed out in the claim.

Figure 10:
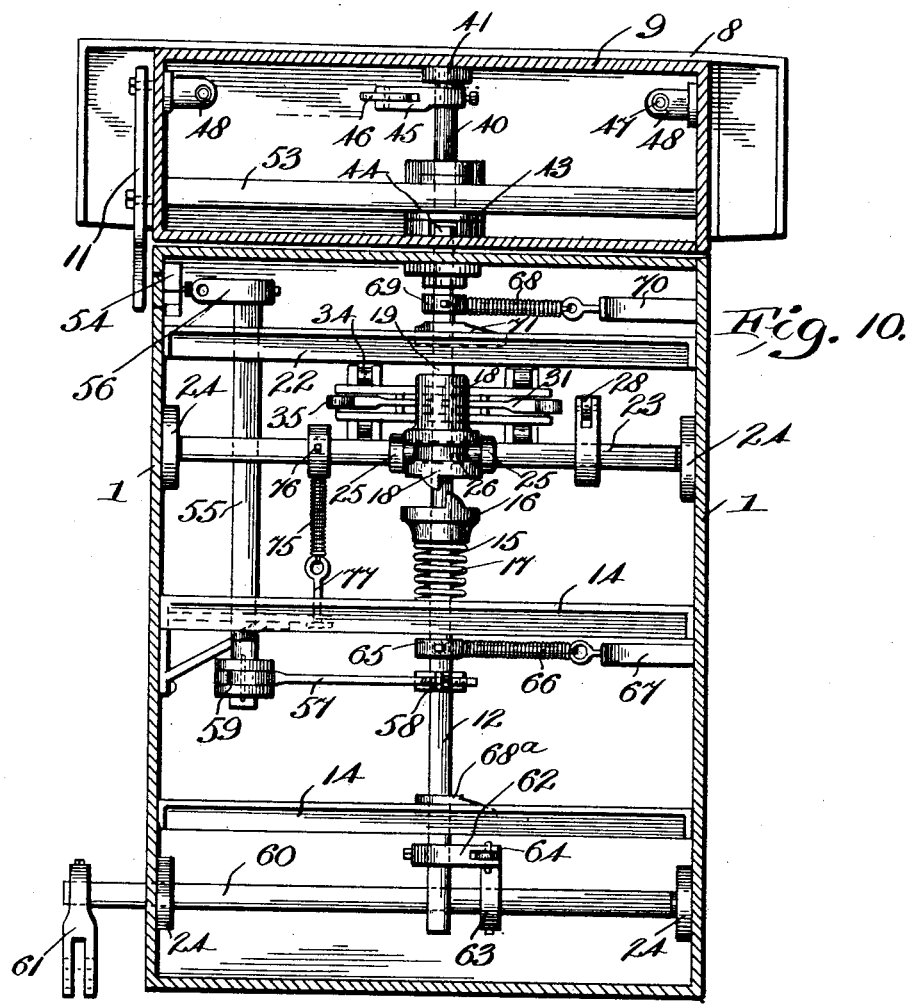
Figure 11:
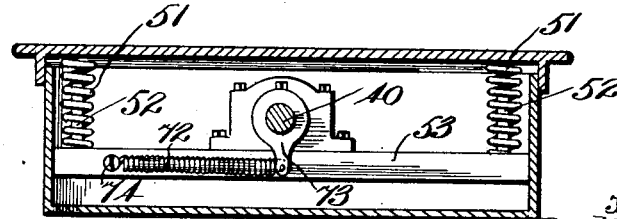

In the accompanying drawings, forming a part of this application, and in which similar reference symbols indicate corresponding parts in the several views: Figure 1 is a perspective view of the apparatus as ready to be mounted on the car. Fig. 2 is a transverse sectional view taken on the line 2—2 of Fig. 1. Fig. 3 is a longitudinal sectional view, in part, taken on the line 3—3 of Fig. 1. Fig. 4 is a detail perspective view of the upper depressible step. Fig. 5 is a longitudinal sectional view of the apparatus complete, and showing the two steps in normal or raised positions. Fig. 6 is a similar view, and showing the two steps in depressed positions; or having been actuated in one sequence; *i. e.* by a passenger entering the car. Fig. 7 is a like view, and showing the two steps having been depressed in another sequence to actuate the register; *i. e.* by a passenger leaving the car. Fig. 8 is a longitudinal sectional view through the lower step and casing on the line 8—8 of Fig. 5 and in the direction of the arrows. Fig. 9 is a sectional view of the clutch taken on line 9—9 of Fig. 5. Fig. 10 is a bottom plan view of the apparatus complete, and Fig. 11 is a view similar to Fig. 8, but taken on the line 11—11 of Fig. 5 and in the direction of the arrows.

Referring to the construction of the apparatus in further detail, 1 designates a casing constructed preferably of sheet metal and of any design convenient for mounting the same on the truck or frame of a car. In the present instance a pair of opposite walls of the casing are cut away as at 2 adjacent the front wall 3 whereby to receive a beam 4 of the car frame to support the casing as will be readily understood. The end wall 5 of the casing is adapted to be bolted or otherwise secured to any adjacent beam of the car frame whereby to securely hold the apparatus in proper position.

A depressible step 6 is mounted on the top 7 of the casing and is adapted to lie flush with the floor of the car, as illustrated in Fig. 7, and a second and lower depressible step 8 is mounted on a relatively small casing 9 that is in turn swingingly mounted on the front wall 3 of the casing through the medium of hinges 10. The second casing 9 is adapted to be swung from the position shown to that indicated in Fig. 1 by a suitable lever control within convenient reach of the motorman or conductor and connecting with a curved arm or bar 11 that is secured to the casing, as in Fig. 1. The casing 9, together with the lower step 8, would be swung out of position when for instance the car is going into the barn or making a special run without passengers. The two steps 6 and 8 are adapted to be depressed through the weight of the passengers entering and leaving the car, and when actuated in one sequence (*i. e.* when a passenger enters a car) no registration is effected, but when operated in another sequence (*i. e.* when a passenger leaves a car) the register will be operated in the manner to be now described.

A shaft 12 is journaled in suitable bearings 13 on bars 14 of a frame contained within the main casing 1, and said shaft is formed with a squared end 15 having slidably mounted thereon one member 16 of a clutch control (see Figs. 7 and 10). A spring 17 mounted on the shaft 12 and seating against one of the frame bars 14 normally holds the clutch member 16 in position for resilient engagement with its complementary clutch element 18 that is splined on a shaft 19 journaled in bearings 20 and 21 of the frame bar 22 and casing wall 3, respectively (see Fig. 7). A shaft 23 is journaled in bearings 24 on the side walls of the casing and carries a forked arm 25 that has engagement with the grooved collar 26 of the clutch member 18 whereby to shift said clutch member into and out of engagement with its complementary member 16 on the shaft 12. A lever 27 secured to the shaft 23 connects with a vertically disposed bar 28 which passes upwardly through the casing top 7 and has its end bifurcated to receive a pin 29 of a notched lug 30 carried by the depressible and upper step 6 (see particularly Fig. 4). Through the medium of the connections just enumerated, the upward and downward movements of the step 6 will operate to throw the clutch control into and out of operative position, as will be clearly seen.

The step 6 is stably mounted on the casing through the medium of a rigid and downwardly disposed flange 31 that passes freely between a pair of plates 32 provided with pairs of anti-friction and guide rollers 33, 34 and 35 (see particularly Figs. 2 and 3). A pin or stud 36 mounted on the side plates 32 passes through a slot 37 of the flange 31 and limits the extent of movement of the step 6; and the downward movement of the step is further limited through the medium of a pair of pins 38 secured on the casing top 7. A pair of cushioning springs 39 are fitted on the pins 38 and contact with the underside of the step 6, as shown, and said springs act to restore the step to its normal position or flush with the floor of the car after each depression.

The clutch mechanism associated directly with the step 6 acts to bring the clutch elements 16 and 18 into axial engagement and accordingly as said clutch members are in one of two predetermined angular relations, shaft 12 will be rotated or remain idle when the step 8 is depressed. As before stated, this relation is determined by the sequence in which the steps 6 and 8 are depressed. Thus when a passenger enters a car the clutch member 18 will be turned at such an angle, as in Fig. 6, that the clutch faces will not engage to operate when the step 6 is depressed. On the other hand when the step 6 is depressed by a passenger leaving the car, the clutch faces will be brought into engagement in the relation shown in Fig. 7 in order that the depression of the step 8 will rotate the shaft 12 through the clutch element.

The operative connections between the lower step 8 and the clutch element 18 consists of a shaft 40 journaled in bearings 41, 42 in the hinged casing 9 and a clutch member 43 mounted on the inner end of said shaft is adapted to engage with the squared end 44 of the shaft 19 that projects through the front wall 3 of the main casing. This connection between the shafts 19 and 40 permits of the swinging movement of said casing 9 as indicated in Fig. 1 and previously referred to.

An arm 45 fixed on the shaft 40 carries a roller 46 at its free end that frictionally engages on the under side of the lower step 8 to the end of turning the shaft 40 through a definite angular distance when the step 8 is depressed. A pair of stops 47 are adjustably mounted on lugs 48 in the casing 9 and have each a recessed head 49 to receive a wearing block 50 of rubber or other suitable material. A pair of springs 51 are fitted on pins 52 on the bar 53 and provide cushioning means for the step and assist in restoring the same to normal after each depression.

A register 54 (see Figs. 1 and 10) of any suitable type is mounted on the casing 1 and is connected to be operated from the shaft 12 through the medium of shaft 55 journaled on the frame bars 14 and 22, and having an arm 56 connecting directly with the register. A link 57 connects the shafts 12 and 55 by arms 58 and 59 mounted on said shafts respectively.

It is proposed to equip the apparatus with means for operating the register ordinarily carried by the car, and to this end a shaft 60 is journaled in the frame 1 and carries at its free end a lever 61 (see Figs. 1 and 10) adapted to be connected with a bar leading to the register. A pair of arms 62 and 63 carried by the shafts 12 and 60 respectively are connected by a link 64 whereby the shaft 60 is turned through an angular distance corresponding with that of the shaft 12 when the latter is operated.

The shaft 12 carries an arm 65 that connects with a retraction spring 66 that is anchored to the bar 67 mounted on the frame 1 to the end of restoring the said shaft to normal after each operation. And a stop lever 68ᵃ likewise secured to the shaft 12 is adapted to engage with one of the frame bars 14 for determining the extent of angular movement of said shaft under the action of spring 66. In like manner the shaft 19 is provided with a retraction spring 68 whose respective ends are secured to the arm 69 on the shaft 19 and an anchoring bar 70 mounted on the casing. A stop lever 71 secured to said shaft limits the angular movement thereof through the action of the retraction spring 68. A retraction spring 72 engages with the shaft 40 by the arm 73, and is anchored at 74 on the cross bar 53 within the casing 9. The shaft 23 is provided with a retraction spring 75 secured at one end to the arm 76 on said shaft, and at its other end is anchored to the bar 77 fixed on the cross bar 14 of the frame.

It is obvious that those skilled in the art may vary the details of construction and arrangement of parts without departing from the spirit of our invention, and therefore we do not wish to be limited to such features except as may be required by the claim.

What we claim is:

In a portable registering apparatus for cars, the combination of a casing, a shaft journaled in said casing and adapted to be connected with a register, a second casing swingingly mounted on the first-named casing, a depressible step mounted on said second casing, and a slip clutch connection between said depressible step and said shaft, whereby the register is operated when said shaft is in the operative relation and said step is depressed, substantially as described.

In testimony whereof, we affix our signatures, in presence of two witnesses.

PAUL P. LOCKLING.
JOSEPH F. PARKER.

Witnesses:
JACOB MARKSTEIN,
HENRY H. HESS.

---

Copies of this patent may be obtained for five cents each, by addressing the "Commissioner of Patents, Washington, D. C."